(12) United States Patent
Malon et al.

(10) Patent No.: US 8,538,161 B2
(45) Date of Patent: Sep. 17, 2013

(54) DYNAMIC RADIAL CONTOUR EXTRACTION BY SPLITTING HOMOGENEOUS AREAS

(75) Inventors: Christopher Malon, Fort Lee, NJ (US); Eric Cosatto, Red Bank, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 131 days.

(21) Appl. No.: 13/315,487

(22) Filed: Dec. 9, 2011

(65) Prior Publication Data

US 2012/0243788 A1    Sep. 27, 2012

Related U.S. Application Data

(60) Provisional application No. 61/466,063, filed on Mar. 22, 2011.

(51) Int. Cl.
    *G06K 9/46* (2006.01)
(52) U.S. Cl.
    USPC .......................................... 382/195; 382/133

(58) Field of Classification Search
    USPC .......................... 382/103, 128, 131, 133, 195
    See application file for complete search history.

(56) References Cited

U.S. PATENT DOCUMENTS

2009/0297007 A1 * 12/2009 Cosatto et al. .............. 382/131
2010/0172568 A1 *  7/2010 Malon et al. ................. 382/133

\* cited by examiner

*Primary Examiner* — Duy M Dang
(74) *Attorney, Agent, or Firm* — Joseph Kolodka

(57) ABSTRACT

Systems and methods for extracting a radial contour around a given point in an image includes providing an image including a point about which a radial contour is to be extracted around. A plurality of directions around the point and a plurality of radius lengths for each direction are provided. Local costs are determined for all radius lengths for each direction by comparing texture variances at each radius length with the texture variance at a further radius length. A radius length is determined, using a processor, for each direction based on the accumulated value of the local costs to provide a radial contour.

20 Claims, 3 Drawing Sheets

DYNAMIC RADIAL CONTOUR EXTRACTION BY SPLITTING HOMOGENEOUS AREAS

RELATED APPLICATION INFORMATION

This application claims priority to provisional application Ser. No. 61/466,063 filed on Mar. 22, 2011, incorporated herein by reference.

BACKGROUND

1. Technical Field

The present invention relates to contour extraction and, more particularly, radial contour extraction by splitting homogeneous areas.

2. Description of the Related Art

Critical markers of disease often depend on the sizes, shapes, and textures of nuclei. Conventionally, pathologists examine small fields of view of a biopsy sample at high (e.g., 400× objective) magnification to closely examine nuclei. However, recent advances in digital microscopy have made it possible to consider biopsy samples using digital micrographs, allowing these statistical measurements to be performed more accurately by using computerized image analysis software. To measure these characteristics of tissue structure, many nuclei in the biopsy sample must be segmented accurately.

Although nuclei should attract hematoxylin dye, nuclei boundaries may be unclear. It has been observed that many nuclei have weak or discontinuously strong edges. Typical contour extraction maximizes edge response at the boundary instead of homogeneity in the interior. However, when the edge responses are unreliable in this way, edge-based contour extractors tend to produce single aggregate detections from touching or nearby nuclei, with one contour enclosing both nuclei shapes.

SUMMARY

A method for extracting a radial contour around a given point in an image includes providing an image including a point about which a radial contour is to be extracted around. A plurality of directions around the point and a plurality of radius lengths for each direction are provided. Local costs are determined for all radius lengths for each direction by comparing texture variances at each radius length with the texture variance at a further radius length. A radius length is determined, using a processor, for each direction based on the accumulated value of the local costs to provide a radial contour.

A method for extracting a radial contour around a given point in an image, includes providing an image including a point about which a radial contour is to be extracted around. A plurality of directions around the point and a plurality of radius lengths for each direction are provided. Local costs are determined for all radius lengths for each direction. A dynamic programming method is applied, using a processor, to determine a plurality of sets, where each set includes a radius length for each direction. After rejecting sets where the first radius length does not equal the last radius length, a set is selected as the radial contour such that the sum of the local costs for the selected set is minimal compared to the other sets.

A system for extracting a radial contour around a given point in an image includes providing an image including a point about which a radial contour is to be extracted around. A plurality of directions around the point and a plurality of radius lengths for each direction are provided. A feature measurement module is configured to determine texture variances for each radius length at each direction. A cost determination module is configured to determine local costs for all radius lengths for each direction by comparing texture variances at each radius length with the texture variance at a further radius length. A minimization module is configured to determine a radius length for each direction based on the accumulated value of the local costs to provide a radial contour.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
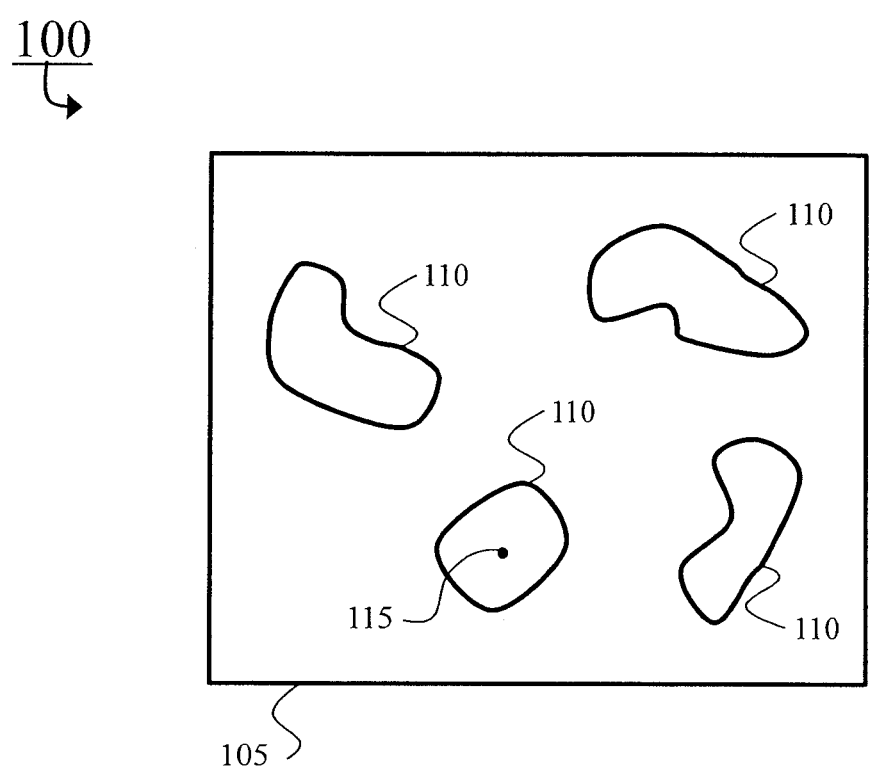
FIG. 1 is an illustrative depiction of an image including an exemplary tissue biopsy sample.

In accordance with the present principles, methods and systems for dynamic radial contour extraction are provided. The contour extractor of the present principles searches for a closed, continuous radial boundary around a point in an image of, e.g., tissue as the "end of a homogeneous region" using a low-complexity dynamic programming method. In particular, for a plurality of directions around the point, texture variances are determined from the point to a plurality of radius lengths ranging from a minimum length to a maximum length for each direction. Local costs are determined for each radius lengths at each direction by subtracting the texture variance at each radius length with the texture variance at a further radius length. A constant is added to the local cost to ensure local costs are nonnegative. A radial contour is determined by applying a dynamic programming method to determine sets of radius lengths, where each set includes a radius length at each direction. A set is selected as the radial contour such that a global cost is minimized. The global cost is based on the accumulation of the local costs.

Advantageously, the present principles eliminate the dependence on edge responses, which are unreliable where, e.g., nuclei have weak or discontinuously strong edges, by minimizing a local cost function to determine the end of a homogeneous region. Such a cost may be minimized even where edges are weak. Additionally, in diagnoses that rely on identifying some remarkably misshapen cell nuclei, the present invention is able to find the remarkable boundaries without penalizing their lack of smoothness. The present invention is faster and produces higher-quality, diagnostically useful results when compared to, e.g., edge-based contour extraction.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a diagram of an exemplary image including a point about which a radial contour is to be extracted around 100 is illustratively depicted. For example, image 105 is a tissue biopsy sample. Tissue biopsy sample 105 includes nuclei 110. Point (p, q) 115 within nuclei 110 is the point, e.g., (0, 0), about which a radial contour is to be extracted around. Sites for point 115 are provided by a separate method, such as the Difference of Gaussian (DoG) method, which is known in the art. It is noted that image 105 is not limited to images to tissue samples, but may include any image with a point around which a radial contour is to be extracted around. Other types of images are contemplated.

Figure 2:
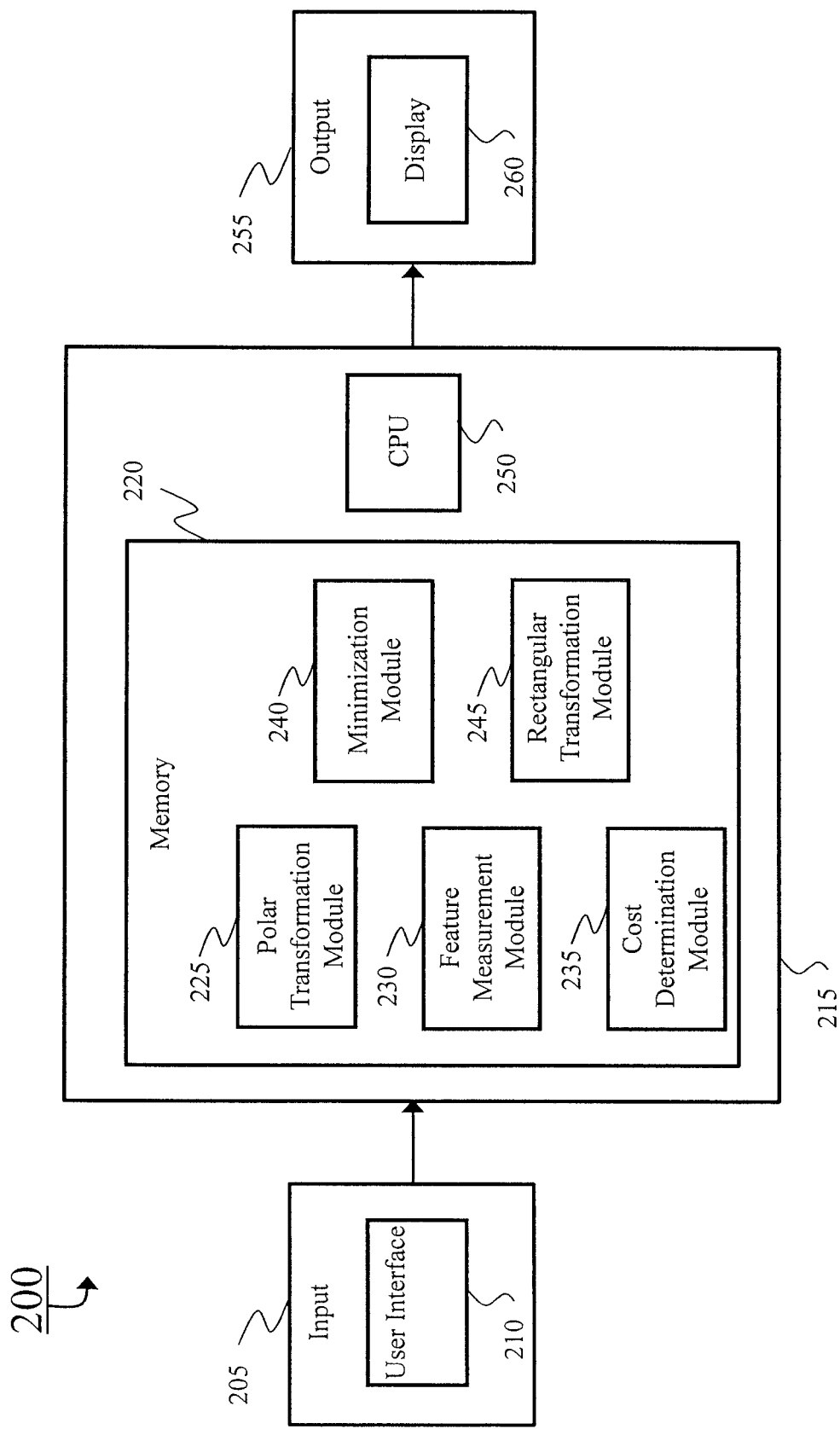
FIG. 2 is a block/flow diagram showing a dynamic radial contour extraction system/method in accordance with one embodiment.

Referring now to FIG. 2, a dynamic radial contour extraction system 200 is illustratively depicted in accordance with one embodiment. Dynamic radial contour extraction system 200 extracts a contour around the point (p, q) 115 (of FIG. 1). Point (p, q) 115 is the point about which a radial contour is to be extracted around. For example, in one embodiment, point 115 may be a point within nucleus 110. Dynamic radial contour extraction system 200 extracts a radial contour based on the end of homogeneity.

It is noted that the present invention is not limited to the extraction of radial contours around nuclei. The present invention may be applied to extract a radial contour around a point in any field. For example, the present invention may be applied to other areas of the biomedical field to determine cytoplasm boundaries in images of cytological samples, such as the liquid-based preparations used in the diagnosis of cervical cancer. In yet another example, the present invention may be applied to determine radial boundaries around faces in a surveillance camera as part of a facial recognition program. Other applications are also contemplated.

Referring again to FIG. 2, input 205 is inputted by the user into dynamic radial contour extraction system 215. User inputs of input 205 may include user interface 210. Input 205 may include real-valued feature map F(x, y), point (p, q) 120, and integers minRadius, maxRadius, numTheta, lookAhead, and maxJump. F(x, y) is bounded by the range $0 \leq F \leq 1$, which ensures that the computed variance cost will be nonnegative. The real-valued feature map F(x, y) may be of an image (e.g., tissue biopsy sample 105) of a, e.g., stained (e.g., hematoxylin and/or eosin) biopsy sample. Point (p, q) 115 represents a point about which a radial contour is to be extracted around. The values minRadius and maxRadius represent the minimum and maximum that the length of the contour from point 115 may be, respectively. The value numTheta represents the number of angles (i.e., directions) around the point 115 that will be used to determine the contour. Dynamic radial contour extraction system 215 uses the lengths at each direction around point 115 from minRadius to maxRadius at every lookAhead value. The value maxJump represents the maximum the length can increase or decrease between consecutive angles θ. As mentioned above, point 115 for each candidate site are provided by a separate method as an input to dynamic radial contour extraction system 215.

Dynamic radial contour extraction system 215 includes memory 220 and CPU 250. Within memory 220 are polar transformation module 225, feature measurement module 230, cost determination module 235, minimization module 240 and rectangular transformation module 245. The real-valued feature map F(x, y) is transformed by polar transformation module 225 into polar coordinates. Polar transformation module 225 receives user inputs maxRadius and numTheta in this transformation. The results of polar transformation module 225 are received by feature measurement module 230 to determine texture variances for all lengths between minRadius and maxRadius at increments of lookAhead, at each direction around point 115. The directions around point 115 are based on the user input numTheta.

Cost determination module 235 determines a local cost by comparing the texture variance determined in feature measurement module 230 at each length with the texture variance at a further length, lookAhead units away. This is done for lengths at each direction. Specifically, cost determination module 235 subtracts a texture variance at each length from the texture variance at a further length and adds a constant. In one embodiment, the constant value is equal to 2. The constant ensures that the local variance cost will be nonnegative. The local variance cost represents the loss in homogeneity if the boundary were to be extended in a particular direction. A smaller cost indicates less difference in homogeneity.

Minimizing module 240 determines a radial contour around point 115 by executing a dynamic programming method to minimize a global cost. The global cost represents the accumulation of the local costs. Minimizing module 240 determines sets of contours, each set including a length at each direction. The set with the minimal global cost in comparison to the other sets is selected as the radial contour. Minimizing module 240 adds a penalty for changes in length at consecutive directions. The penalty is added to the accumulated cost. Where differences in length exceed the value maxJump, an infinite penalty is imposed (i.e., the connection is not allowed). Where differences in length do not exceed the maxJump constraint, a penalty of zero is imposed. In one embodiment, the set is rejected where the length at the direction of angle $2\pi$ does not equal the length at the direction of angle 0 by imposing an infinite cost. This helps to enforce continuity and ensure that the boundary will be a closed loop.

Rectangular transformation module 245 transforms the resulting boundary from polar coordinates to rectangular. Output 255 of dynamic radial contour extraction system 215 returns a radial contour around the input point. Output 250 may include display 255. It is further noted that user interface 210 may also be included as part of output 250.

By analyzing the variance to find the end of homogeneity of the texture that begins around a point 115 within nucleus 110, the present principles are better able to deal with irregular nuclei boundaries, particularly when compared to edge-based contour extraction. Additionally, the present principles perform in linear time in the number of pixels to be search for the boundary, which may lead to faster operation and higher quality, diagnostically useful results. The operation of dynamic radial contour extraction system 200 will be discussed in further detail with respect to FIG. 3 below.

Figure 3:
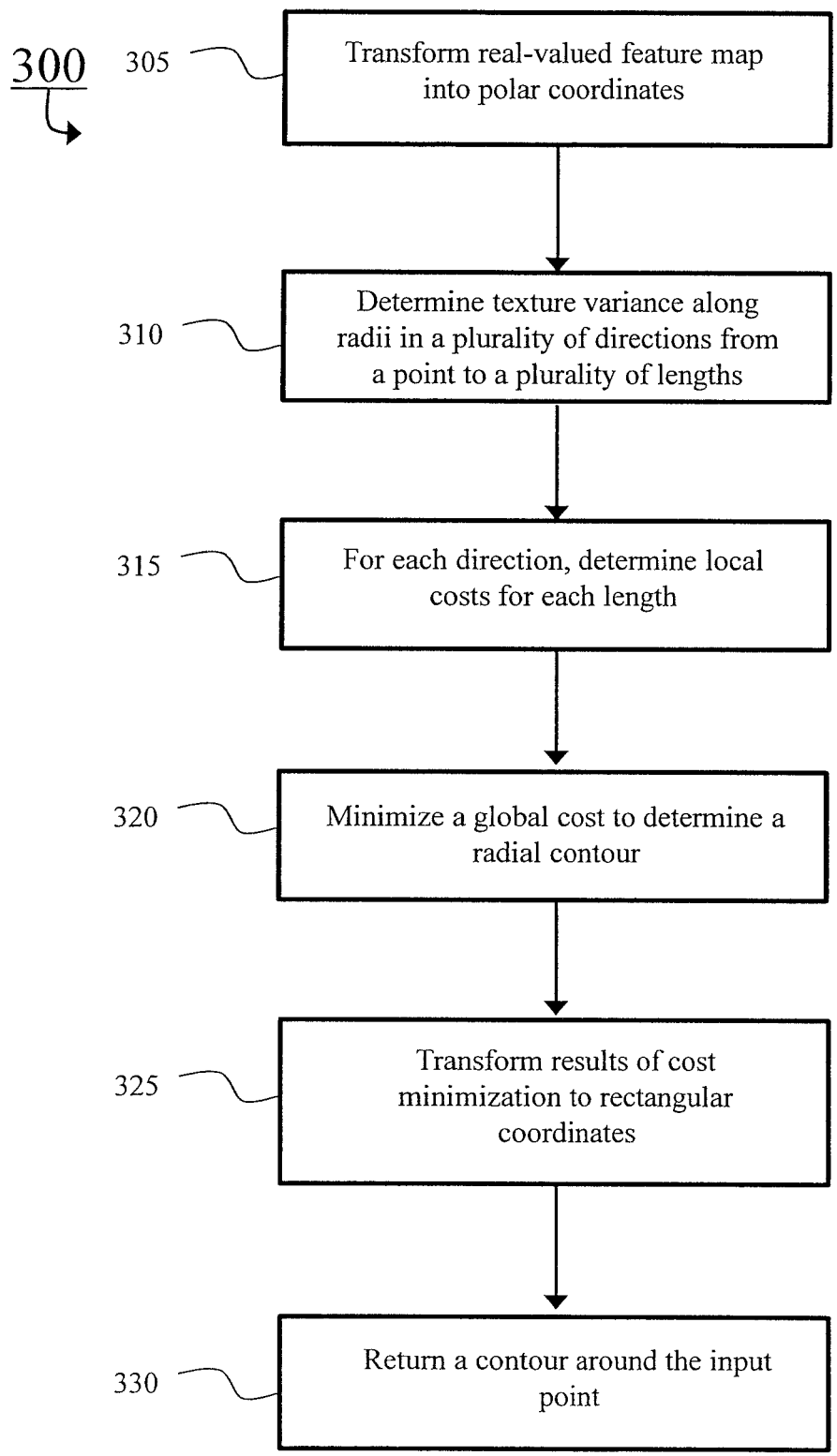
FIG. 3 is a block/flow diagram showing a system/method of dynamic radial contour extraction in accordance with one embodiment.

Referring now to FIG. 3, the dynamic radial contour extraction method 300 is illustratively depicted in accordance with one embodiment. In block 305, the real-valued feature map $F(x, y)$ is first transformed into polar coordinates. F is bound by the range $0 \leq F \leq 1$ to ensure the computed variance cost will be nonnegative. A polar transform around the input point transforms the feature map F into a map G as follows:

$$G(r, s) = F(p + r\cos\theta, q + r\sin\theta) \quad (1)$$

where $$\theta = \frac{2\pi s}{numTheta}$$

$$0 \leq s \leq numTheta$$

$$1 \leq r \leq maxRadius.$$

and where user input numTheta represents the number of angles that the dynamic radial contour extraction method 300 uses in its radial contour extraction and maxRadius is the inputted maximum radius of each contour. Angles $\theta$ represent the directions around point $(p, q)$ 115, as provided for above.

Preliminarily, texture variance is derived for an arbitrary signal $T(x, y)$ (for example, but without limitation, T may represent pixel luminance) with respect to a given boundary. Texture variance of T around the point $(p, q)$ inside a boundary parameterized in polar coordinates by $\rho(\theta)$ is defined by the variance of T as follows:

$$H = \int_{\theta=0}^{2\pi} \sigma_\theta(p(\theta)) d\theta \quad (2)$$

where $$\sigma_\theta(r) = \int_{r'=0}^{r} (T_{polar}(r', \theta))^2 dr' - \frac{1}{r}\left(\int_{r'=0}^{r} T_{polar}(r', \theta) dr'\right)^2. \quad (3)$$

Locally (i.e., for each direction), the goal is to bound the point by a boundary B such that the texture variance H of T inside B is small and sharply rises if B is further extended. This amounts to minimizing the following local cost function $$C_\theta(r) = \sigma_\theta(r) - \sigma_\theta(r+\delta) + 2 \quad (4)$$

for a constant $\delta$=lookAhead that affects smoothness. The local cost function of equation (4) is a measure of the change in texture variance between a length r and a length $r+\delta$, where a smaller local cost indicates a larger increase in texture variance and less homogeneity. Assuming F is normalized so that $0 \leq F \leq 1$, the "2" term ensures that local cost is nonnegative ($C_\theta \geq 0$).

The cost derivation discussed above is applied to the transformed map $G(r, s)$. The contours to be produced by dynamic radial contour extraction method 300 may be parameterized by their radii $\rho = r(\theta)$ in terms of the angle (i.e., they do not cross the same angle multiple times). In block 310, a texture variance is determined along a radius for each direction around point 115. For each direction, texture variances are determined from point 115 to lengths between minRadius and maxRadius. To determine texture variance along the radius from point $(p, q)$ 115 out to the point $r(\theta)$ for each angle $\theta$, the standard deviation of the polar transformation of the input points G is measured:

$$\sigma_\theta(r) = \sqrt{\frac{\sum_{r'=1}^{r} G(r', s)^2}{r} - \left(\frac{\sum_{r'=1}^{r} G(r', s)}{r}\right)^2}. \quad (5)$$

Locally (at a specific angle $\theta$), the goal is to determine the boundary at a point where the homogeneity inside the contour is good ($\sigma_\theta(r)$ is small) but the homogeneity would be much worse if the contour were pushed further out ($\sigma_\theta(r+\text{lookAhead})$ is much bigger). Thus, in block 315, for each direction, a local cost is determined for each length between minRadius and maxRadius at intervals of lookAhead. The local cost is provided in equation (6).

$$C(r,s) = \sigma_\theta(r) - \sigma_\theta(r+\text{lookAhead}) + 2 \quad (6)$$

In block 320, a global cost is minimized to determine a radial contour using a loop construct method. A global cost for all angles $\theta$ (i.e., all directions) representing the sum of the local costs is provided:

$$\text{Cost}(\rho) = \sum_{s=0}^{numTheta-1} C_\theta\left(\rho\left(\frac{2\pi s}{numTheta}\right)\right). \quad (7)$$

The range of F ensures that the cost will be nonnegative. The global cost is minimized such that the set of lengths at each direction result in the cheapest accumulated local cost. A loop construct method is implemented to minimize cost whereby a set of boundaries is determined and the set with the minimal cost compared to the other sets is selected as the radial boundary.

In one embodiment, the loop construct method is a dynamic programming method. The radius length $\rho$ of the boundary at each angle $\theta$ is determined by minimizing Cost ($\rho$) of equation (7), such that $\rho(\theta) \in [\text{minRadius}, \text{maxRadius}]$, $$\left|\rho\left(\frac{2\pi(s+1)}{numTheta}\right) - \rho\left(\frac{2\pi s}{numTheta}\right)\right| \leq maxJump, \text{ and}$$

$$\rho(0) = \rho(2\pi).$$

Setting an appropriate minRadius avoids a trivially small enclosure with zero variance in F.

In one embodiment, the loop construct method rejects solutions where the length determined at angle $\theta=0$ does not equal the length at angle $\theta=2\pi$ by imposing an infinite cost at angle $\theta=2\pi$. This ensures that the radius selected at angle $\theta=0$ is the same as the radius at angle $\theta=2\pi$ so that the chosen path is not only continuous, but also a closed loop. Additionally, any step where costs are equal, the loop construct method will always prefer the parent with a shorter radius. The modified loop construct method (i.e., computation of cost C, followed by programming search) has a complexity of O(maxRadius·numTheta·maxJump·lookAhead) per candidate.

In block 325, the resulting boundary is transformed from polar coordinates into rectangular coordinates. In block 330, a contour around the input points is returned. In one embodiment, bad candidate detections can be filtered by setting a threshold on H inside the extracted contour.

Having described preferred embodiments of a system and method for dynamic radial contour extraction by splitting homogeneous areas (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for extracting a radial contour around a given point in an image, comprising:
    providing an image including a point about which a radial contour is to be extracted around;
    providing a plurality of directions around the point;
    for each direction, providing a plurality of radius lengths;
    determining local costs for all radius lengths for each direction by comparing texture variances at each radius length with the texture variance at a further radius length; and
    determining a radius length, using a processor, for each direction based on the accumulated value of the local costs to provide a radial contour.

2. The method as recited in claim 1, wherein determining local costs include subtracting the texture variance at each radius length from the texture variance at a further radius length and adding a constant.

3. The method as recited in claim 2, wherein the constant ensures the local costs are nonnegative.

4. The method as recited in claim 1, wherein determining a radius length includes applying a dynamic programming method to determine a plurality of sets, each set including a radius length for each direction, wherein a set is selected as the radial contour such that the sum of the local costs for the selected set is minimal compared to the other sets.

5. The method as recited in claim 4, further comprising rejecting a set where the first radius length does not equal the last radius length.

6. The method as recited in claim 1, wherein a penalty is imposed for changes in radius lengths at two consecutive directions that are larger than a length constraint value.

7. The method as recited in claim 6, wherein the penalty is an infinite penalty.

8. The method as recited in claim 1, wherein the image is an image of tissue.

9. A computer readable storage medium comprising a computer readable program, wherein the computer readable program when executed on a computer causes the computer to execute the method as recited in claim 1.

10. A method for extracting a radial contour around a given point in an image, comprising:
    providing an image including a point about which a radial contour is to be extracted around;
    providing a plurality of directions around the point;
    for each direction, providing a plurality of radius lengths;
    determining local costs for all radius lengths for each direction; and
    applying a dynamic programming method, using a processor, to determine a plurality of sets, each set including a radius length for each direction, wherein a set is rejected where the first radius length does not equal the last radius length, and further wherein a set is selected as the radial contour such that the sum of the local costs for the selected set is minimal compared to the other non-rejected sets.

11. The method as recited in claim 10, wherein determining local costs include subtracting the texture variance at each radius length from the texture variance at a further radius length and adding a constant.

12. The method as recited in claim 11, wherein the constant ensures that the local costs are nonnegative.

13. The method as recited in claim 10, wherein an infinite penalty is imposed for changes in radius lengths at two consecutive directions that are larger than a length constraint value.

14. A system for extracting a radial contour around a given point in an image, comprising:
    providing an image including a point about which a radial contour is to be extracted around;
    providing a plurality of directions around the point;
    for each direction, providing a plurality of radius lengths;
    a feature measurement module configured to determine texture variances for each radius length at each direction;
    a cost determination module configured to determine local costs for all radius lengths for each direction by comparing texture variances at each radius length with the texture variance at a further radius length; and
    a minimization module configured to determine a radius length for each direction based on the accumulated value of the local costs to provide a radial contour.

15. The system as recited in claim 14, wherein determining local costs include subtracting the texture variance at each radius length from the texture variance at a further radius length and adding a constant.

16. The system as recited in claim 15, wherein the constant ensures the local costs are nonnegative.

17. The system as recited in claim 14, wherein determining a radius length for each direction includes applying a dynamic programming method to determine a plurality of sets, each set including a radius length for each direction, wherein a set is selected as the radial contour such that the sum of the local costs for the selected set is minimal compared to the other sets.

18. The system as recited in claim 17, further comprising rejecting a set where the first radius length does not equal the last radius length.

19. The system as recited in claim 14, wherein a penalty is imposed for changes in radius lengths at two consecutive directions that are larger than a length constraint value.

20. The system as recited in claim 19, wherein the penalty is an infinite penalty.

* * * * *